3,383,167
MANUFACTURE OF MAGNESIUM PHOSPHATE BY REACTION OF ROCK PHOSPHATE WITH MAGNESIUM SULFATE
Ruth Blumberg, Simon Lavie, and Abraham Baniel, Haifa, Israel, assignors, by mesne assignments, to Israel Mining Industries-Institute for Research and Development, a company of Israel
No Drawing. Filed Oct. 22, 1963, Ser. No. 318,080
Claims priority, application Israel, Nov. 23, 1962, 18,278
8 Claims. (Cl. 23—105)

This invention concerns processes for the manufacture of anhydrous magnesium phosphate, possibly in mixture with calcium sulphate, from tertiary calcium phosphate, especially rock phosphate. The invention is primarily concerned with such processes of the kind aforesaid in which tertiary magnesium orthophosphate, as a rule contaminated with some magnesium fluoride and magnesium oxide, is produced by the complete replacement of the calcium of the rock phosphate by magnesium. However, the invention also extends to the case of the partial replacement of the calcium of the rock phosphate by magnesium, whereby tertiary magnesium orthophosphate and possibly some magnesium fluoride and magnesium oxide is produced while some of the tertiary calcium orthophosphate contained in the rock phosphate and possibly some of the calcium fluoride and calcium carbonate of the rock phosphate remain, or some tertiary mixed magnesium-calcium orthophosphates are produced. For the purposes of this invention the presence in the final products of magnesium salts other than magnesium orthophosphate will be disregarded and both the tertiary magnesium orthophosphate and any tertiary mixed magnesium-calcium phosphates will be referred to herein as "magnesium phosphate" for short.

Attempts were already made to manufacture fertilizers containing magnesium phosphate in mixture with calcium sulphate. For this purpose a mixture of rock phosphate and magnesium sulphate, or a double salt one of whose components is magnesium sulphate, was heated to complete fusion of all components, which required temperatures of at least 1000° C., and in most cases considerably above that temperature. Work at so high temperatures is expensive in terms of energy, and technically inconvenient.

It is the object of the present invention to provide a process whereby mixtures of magnesium phosphate and calcium sulphate can be produced by the mathematical reaction of rock phosphate with magnesium sulphate, added to or formed in the reaction mixture, at appreciably lower temperatures than those suggested hitherto.

According to the invention, rock phosphate is heated in a reaction mixture which contains on the one hand magnesium sulphate, and on the other hand a salt lowering the fusion temperature of magnesium sulphate to a temperature at which the non-phosphate salts are partially or fully fused while the phosphates remain solid, being below their fusion point and substantially insoluble in the fused part of the reaction mixture.

The invention may be performed in several different ways, e.g. as follows:

(a) The partial fusion of the reaction mixture may be effected either by the substantially complete melting of the salts other than the orthophosphates present at any time, i.e. tertiary calcium orthophosphate at the beginning, and increasing proportions of tertiary magnesium or mixed magnesium-calcium orthophosphates as the reaction proceeds; or by a mere sintering (incipient fusion) of such salts other than the orthophosphates. The completely melting or merely sintering salts of the reaction system will be referred to hereinafter as "fusible ingredients" for short. Experiments will determine for each particular composition of starting materials whether the sintered or the fully liquefied state of the non-phosphate salts is to be preferred;

(b) The magnesium salt component of the fusible ingredients may essentially consist of magnesium sulphate while the fusion-temperature lowering components may be, for example, an alkali metal sulphate or chloride;

(c) The magnesium salt and fusion-temperature lowering salt components of the fusible ingredients may be supplied in common by a naturally occurring or technically produced double salt or salt mixture containing a substantial proportion of magnesium sulphate;

(d) The incipient fusion or complete melting of the fusible ingredients of the reaction mixture may be achieved by the heating in common of rock phosphate and the fusible ingredients;

(e) The rock phosphate and fusible ingredients may be fed, together or separately, and either continuously or in batches, into a bath of molten salt from which magnesium phosphate and possibly calcium sulphate, as far as insoluble in the bath, is or are withdrawn, contaminate with some bath liquid carried off by the solids (the extent to which this contamination can be reduced will depend on the efficacy of the mechanical method used for separating the solids);

(f) The magnesium sulphate required for the reaction with the rock phosphate may either be included as such among the fusible ingredients of the reaction mixture, or the fusible ingredients may contain a magnesium salt other than the sulphate, e.g. the chloride, and as a fusion-temperature lowering salt a sulphate, e.g. an alkali metal sulphate, since in the fused state this mixture behaves, as regards the formation of magnesium phosphate and calcium sulphate, as if magnesium sulphate had been supplied as such;

(g) If the process is carried out in accordance with paragraph (e) above, the bath of fused salts into which the reactants are fed, may either be constituted by the fusible ingredients of the reaction mixture or by an altogether different salt or salt mixture.

The process according to the invention can be performed at temperatures in the range between about 600° and about 800° C., which is appreciably lower than the lowest temperatures indicated in connection with the published earlier experiments mentioned above, and these latter in turn are considerably lower than the temperatures required for the actual practical performance of the process in the absence of fusion-temperature-lowering salts, for which temperatures considerably higher than 1000° C. are required. In the lower temperature range in which the process according to this invention is carried out, fewer problems of apparatus corrosion arise and considerably less thermal energy is required. Moreover, the invention makes it possible to use, as the magnesium-containing reactant, naturally occurring double salts or technically produced salt mixtures which otherwise are not usable as such but, if their technical exploitation is intended, have as a rule to be resolved into their components.

The mixtures of magnesium phosphate and calcium sulphate obtained by the process according to the invention can in the first place be used as fertilizers in which a substantial proportion of the original $P_2O_5$ has been converted into the citrate soluble state. In many cases the presence of calcium sulphate in such fertilizers is positively desirable, in other cases it is at least not harmful and forms a tolerable ballast.

The mixtures obtained by the process according to the invention can also be used as starting materials for the manufacture of other phosphates by processes in which the calcium sulphate component of the mixtures may either be eliminated altogether at some stage, or follow the phosphate into the final products.

Calcium sulphate is appreciably soluble in certain salt melts of the type used for the molten baths in which the reaction between the tertiary calcium phosphate and the magnesium salt component is carried out in certain embodiments of this invention. The product obtained in the case of these embodiments is, therefore, much poorer in calcium sulphate, i.e. richer in magnesium phospate, than in other cases. By the judical selection of the conditions of operation the calcium sulphate content of the final product can in practice be eliminated from the final product. Calcium sulphate is also somewhat soluble in salt brines, especially those containing chlorides, and some $CaSO_4$ will thus usually be removed when the magnesium phosphate-calcium sulphate mixture is washed to remove the water-soluble ingredients of the reaction mixture.

The invention is illustrated by the following examples, to which it is not limited.

Example 1

A mixture was prepared from 100 g. of Florida phosphate containing 35.3% of $P_2O_5$ and 35.3% of total Ca in the form of tertiary calcium phosphate, calcium fluoride and calcium carbonate, and 262 g. of astrakanite ($MgSO_4 \cdot Na_2SO_4$). In this mixture the amount of $MgSO_4$ was in excess by about 10% over the quantity required stoichiometrically for the complete conversion of all the calcium of the rock phosphate into the corresponding magnesium compounds (tertiary phosphate, fluoride and carbonate), and the fusion-temperature-lowering salt was the sodium sulphate of the astrakanite. The mixture was heated at 660° C. for 30 minutes while being continuously stirred by means of an appropriate stirring device. By this operation the mixture was brought to incipient fusion, that is, the fusible ingredients thereof, supplied by the astrakanite, were softened without being completely melted. The phosphate component remained completely solid but was gradually transformed from tertiary calcium orthophosphate into tertiary magnesium orthophosphate. The mixture was thereafter allowed to cool and washed with water in order to remove the $Na_2SO_4$, the residual excess of $MgSO_4$, and a part of the $CaSO_4$.

The washed product was dried. It then amounted to 140 g. and contained:

| | Percent |
|---|---|
| $P_2O_5$ | 24 |
| Mg | 13 |
| Ca | 17 |
| $SO_4$ | 37.8 |

Example 2

A mixture was prepared from 100 g. of Morocco rock phosphate containing 32.2% $P_2O_5$ and 34.8% of total Ca, and 170 g. of crude Kieserite ($MgSO_4 \cdot H_2O$) containing 6.4% of NaCl. In this mixture, the magnesium sulphate was in excess by about 20% over the amount required stoichiometrically for the complete conversion of the calcium compounds contained in the starting material into the corresponding magnesium compounds. The fusion-temperature lowering salt was the sodium chloride contained in the Kieserite as an impurity.

The mixture was heated for 30 minutes to 670°–700° C. whereby a sintered mass was obtained. In the process the fusible ingredients of the mixture were so much softened, without being actually melted down, that the mixture as a whole formed a sintered body in which the solid particles of magnesium phosphate and calcium sulphate were agglomerated by the fusible ingredients.

The sintered mass was allowed to cool and then washed with water until the effluent was free from chloride ion. The washed product was dried and then amounted to 150 g., containing:

| | Percent |
|---|---|
| $P_2O_5$ | 20.8 |
| Mg | 14.2 |
| Ca | 15.2 |
| $SO_4$ | 32.9 |

Example 3

A mixture was prepared from 87 g. of the same Morocco rock phosphate as in Example 2, and 210 g. of kainite ($KCl \cdot MgSO_4 \cdot 3H_2O$). The mixture was heated at 680–730° C. for 30 minutes whereby the incipient fusion of the fusible ingredients was achieved. The hot mass was quenched in water, in which the soluble components dissolved, then the solids were removed from the supernatant aqueous solution and dried, whereby 150 g. of a product was obtained which contained:

| | Percent |
|---|---|
| $P_2O_5$ | 18.1 |
| Ca | 13.8 |
| Mg | 13.4 |

Example 4

The same mixture as in Example 3 was subjected to the same heat treatment as described in that example, but the hot reaction mixture, instead of being quenched in water, was simply allowed to cool in the air and thereafter ground.

The product thereby obtained amounted to 250 g. and contained:

| | Percent |
|---|---|
| $P_2O_5$ | 11 |
| Mg | 8.1 |
| Ca | 12.1 |
| K | 12.7 |

This product is a mixed fertilizer which in addition to the magnesium phosphate and calcium sulphate also contains an appreciable proportion of potassium.

Example 5

400 g. of a naturally occurring mixture of $MgSO_4 \cdot H_2O$, KCl and NaCl (in this case in the ratios 29:21:49) also known by the German term "Hartsalz," was completely melted at 600–640° C., then 75 g. of the same Morocco rock phosphate as in Example 2 was added to the melt and the heating was continued for 15 minutes at 640–730° C. Solid magnesium phosphate, which is substantially insoluble in the melt, settled out and could be separated together with a part of the $CaSO_4$ formed, while a substantial part of the latter remained dissolved in the melt.

The solid product removed from the bath was washed with water and dried. It then amounted to 102 g. and contained:

| | Percent |
|---|---|
| $P_2O_5$ | 23.5 |
| Mg | 16.8 |
| Ca | 12.8 |

Example 6

A mixture was prepared from 100 g. of the same Morocco rock phosphate as in Example 2 and 413 g. of a mixture of langbeinite and sodium sulphate (29% of $MgSO_4$, 21.1% of $K_2SO_4$, 48.9% of $Na_2SO_4$). The mixture was heated at 650° C. for 30 minutes whereby the fusible ingredients were melted. The mixture was stirred for another 30 minutes at 650–700° C.

The mixture was then allowed to cool in the air to somewhat below 100° C. so that it could be leached hot with water without evaporation of an unduly large proportion of the latter, whereby the potassium and sodium sulphates were extracted. The residue was dried and then amounted to 155 g. It contained:

| | Percent |
|---|---|
| $P_2O_5$ | 20.4 |
| Mg | 15.2 |
| Ca | 14.7 |
| $SO_4$ | 35.4 |

Example 7

600 g. of a melt consisting of 12.1% of $CaSO_4$ and 87.9% of $K_2SO_4$ was heated to 710° C. At that temperature, 100 g. of the same Florida phosphate as in Example 1 and 128 g. of Kieserite ($MgSO_4 \cdot H_2O$) were added to the melt and the mixture was kept at 710–730° C. for 30 minutes. Magnesium phosphate settled from the melt and was removed at the bottom of the bath together with some amount of adhering salts, while a molten mixture of $K_2SO_4$ and $CaSO_4$ was drawn off at the top. Fresh amounts of rock sulphate and Kieserite were added to the bath, continually or in portions, at the same rate as magnesium phosphate, $K_2SO_4$ and $CaSO_4$ were withdrawn. Make-up portions of potassium sulphate were added as needed. No further calcium sulphate had to be added since the quantities required to maintain the fluidity of the bath was constantly formed by the reaction.

The composition of the magnesium phosphate withdrawn from the bath depended on the method of separation and the quantity of adhering bath fluid. Since the bath contained potassium the product, after being allowed to cool in the air and being ground, could be used without further purification as a mixed fertilizer. A typical sample contained:

| | Percent |
|---|---|
| $P_2O_5$ | 13.6 |
| Mg | 8.6 |
| Ca | 14 |
| K | 9 |

We claim:

1. The method of producing anhydrous magnesium phosphate comprising
   reacting rock phosphate, containing calcium, at 600–800° C. in an at least partially molten condition with a mixture of magnesium sulfate and an alkali metal sulfate or chloride salt for lowering the fusion temperature of magnesium sulfate to a temperature at which the non-phosphate salts are partially or fully fused while the phosphates remain solid, which mixture is capable of at least partially fusing at 600–800° C., said mixture containing an amount of magnesium stoichiometrically equivalent to the amount of calcium of the rock phosphate desired to be replaced, thereby producing anhydrous magnesium phosphate.

2. The process of claim 1, wherein magnesium sulphate is introduced as such into the reaction mixture.

3. The process according to claim 1, wherein said magnesium sulfate and fusion-temperature-lowering salt are supplied to the reaction mixture in common in form of a double salt.

4. The process according to claim 1, wherein said magnesium sulfate and fusion-temperature-lowering salt are supplied to the reaction mixture in common in form of a salt mixture containing a substantial proportion of magnesium sulphate.

5. The process according to claim 1, wherein the reaction conditions are so selected as to achieve a complete replacement of the calcium of the rock phosphate by magnesium and the magnesium phosphate contained in the product is substantially tertiary magnesium orthophosphate.

6. The process according to claim 1, wherein the reaction conditions are so selected as to achieve only a partial replacement of the calcium of the rock phosphate by magnesium and the phosphates in the product are selected from the group of anhydrous tertiary magnesium orthophosphate plus tertiary calcium orthophosphate and anhydrous tertiary mixed magnesium-calcium phosphate.

7. The method of producing anhydrous magnesium phosphate comprising:
   forming a bath of molten salt at 600–800° C., said molten bath comprising an alkali metal sulfate or chloride salt capable of lowering the fusion temperature of magnesium sulfate to a temperature at which the non-phosphate salts are partially or fully fused while the phosphates remain solid;
   feeding calcium containing rock phosphate into said molten bath;
   feeding magnesium sulfate into said molten bath in an amount stoichiometrically equivalent to the amount of calcium desired to be replaced;
   feeding an alkali metal sulfate or chloride salt capable of lowering the fusion temperature of magnesium sulfate to a temperature at which the non-phosphate salts are partially or fully fused while the phosphates remain solid, into said molten bath in an amount sufficient to maintain said bath molten at 600–800° C.;
   reacting the magnesium from said magnesium sulfate and the phosphate from said rock phosphate at 600–800° C. to form anhydrous magnesium phosphate; and
   withdrawing said anhydrous magnesium phosphate from said bath.

8. The process according to claim 7, wherein the rock phosphate, on the one hand, and the magnesium salt and the salt capable of lowering the fusion temperature of magnesum sulphate, on the other hand, are fed into said bath separately.

References Cited
UNITED STATES PATENTS 3,194,632  7/1965  Baniel et al. _____ 23—105

OSCAR R. VERTIZ, *Primary Examiner.*

O. F. CRUTCHFIELD, H. S. MILLER,
*Assistant Examiners.*